United States Patent [19]

Kashiwagi et al.

[11] Patent Number: 4,998,748
[45] Date of Patent: Mar. 12, 1991

[54] VEHICLE SUSPENSION SYSTEM

[75] Inventors: Akihiro Kashiwagi; Takao Kijima, both of Hiroshima, Japan

[73] Assignee: Mazda Motor Corporation, Hiroshima, Japan

[21] Appl. No.: 503,860

[22] Filed: Apr. 3, 1990

[30] Foreign Application Priority Data

Apr. 4, 1989 [JP] Japan .................................. 1-86667

[51] Int. Cl.⁵ .............................................. B60G 3/00
[52] U.S. Cl. .................................... 280/690; 280/675; 280/701; 280/716; 280/725
[58] Field of Search ............... 280/688, 690, 701, 716, 280/726, 675

[56] References Cited

U.S. PATENT DOCUMENTS

| | | | |
|---|---|---|---|
| 4,245,853 | 1/1981 | Inoue et al. | 280/701 |
| 4,269,432 | 5/1981 | Inoue et al. | 280/690 |
| 4,440,419 | 4/1984 | Kosak et al. | 280/701 |
| 4,471,974 | 9/1984 | Kosak et al. | 280/701 |
| 4,511,160 | 4/1985 | Inoue | 280/690 |
| 4,589,677 | 5/1986 | Matschinsky | 280/675 |
| 4,810,004 | 9/1989 | Kanai et al. | 280/690 |
| 4,815,755 | 3/1989 | Takata et al. | 280/690 |

Primary Examiner—Kenneth R. Rice
Attorney, Agent, or Firm—Sixbey, Friedman, Leedom & Ferguson

[57] ABSTRACT

A suspension system for a vehicle includes a driving wheel support which supports for rotation a driving wheel of the vehicle, and a wheel guide which includes a plurality of arm members each of which is connected to the driving wheel support at its outer end and to the vehicle body at its inner end. The wheel guide restrains the toe angle of the driving wheel, and is arranged to cause the driving wheel to move in the direction of toe-in when a rearward load acts on the driving wheel and the driving wheel is displaced rearward. The wheel guide includes a resilient support member and a toe-out restraining member. The resilient support member resiliently supports the driving wheel support relative to the vehicle body and is arranged to contract when an external force acts thereon in a certain direction and to expand when an external force acts thereon in the reverse direction so that the driving wheel moves in the direction of toe-in when a forward driving force acts on the driving wheel. When a rearward load acts on the driving wheel while a forward driving force is acting on the driving wheel, the toe-out restraining member restrains the resilient support member from abruptly displacing the driving wheel in the direction of toe-out while permitting the resilient support member to slowly displace the driving wheel in the direction of toe-out.

19 Claims, 10 Drawing Sheets

F I G. 10
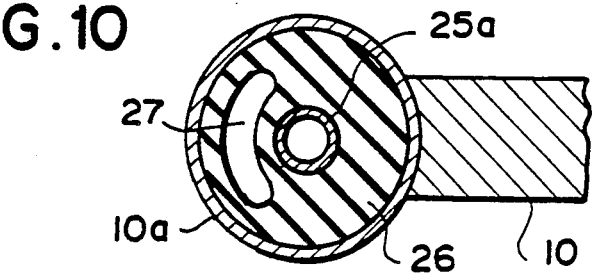
F I G. 11
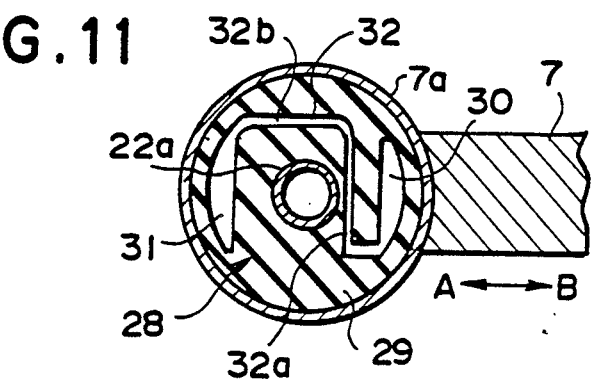
F I G. 12
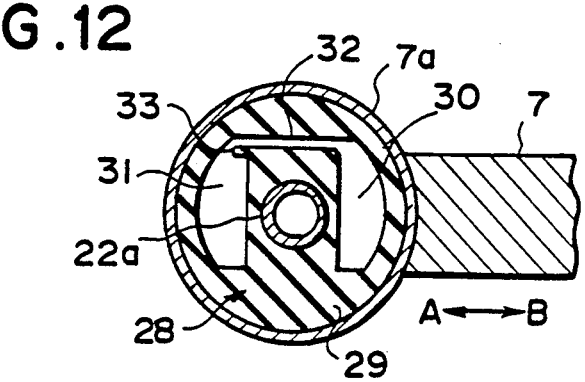
F I G. 13
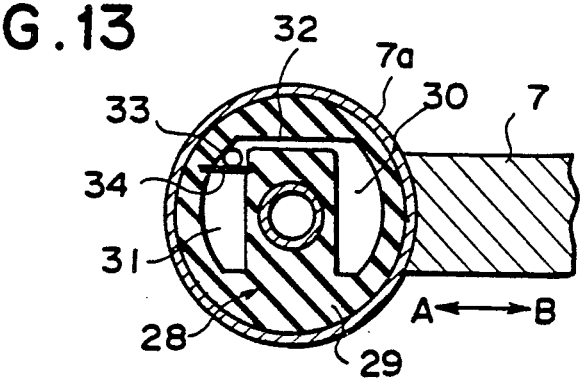

F I G. 15
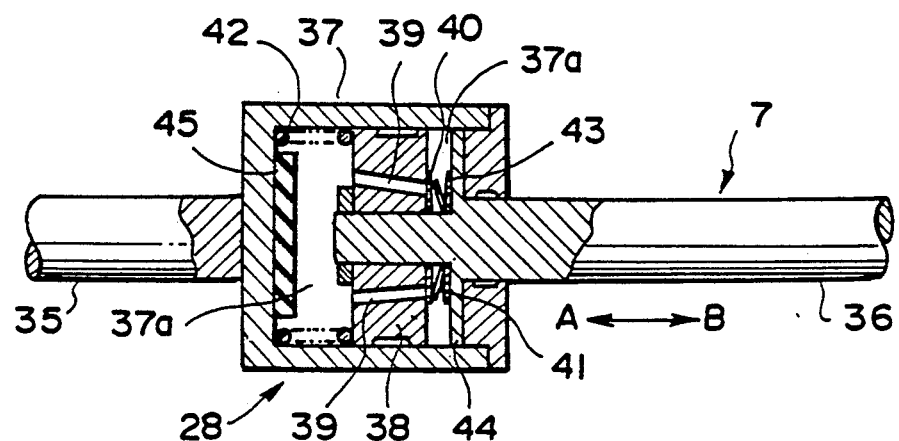
F I G. 16
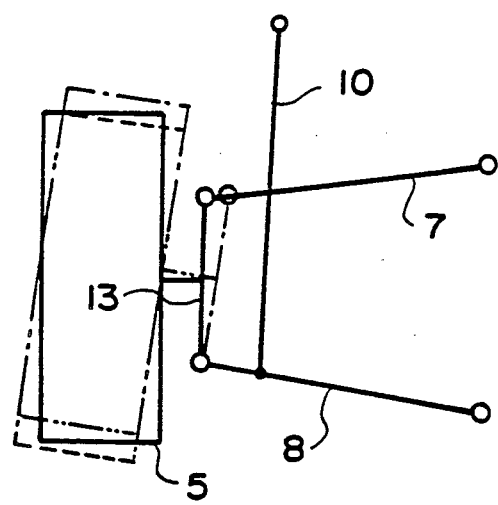

VEHICLE SUSPENSION SYSTEM

BACKGROUND OF THE INVENTION

Field of the Invention

This invention relates to a vehicle suspension system, and more particularly to a suspension system which supports a driving wheel.

Description of the Prior Art

As is well known, the double wishbone type suspension system has a pair of lateral links for limiting the toe angle of the wheel. (See U.S. Pat. No 4,723,791, for instance.)

When such a double wishbone type suspension is used for supporting a driven wheel, the pair of lateral links may be simply arranged so that the wheel is moved in the direction of toe-in when the vehicle is decelerated. On the other hand, when the double wishbone type suspension is used for supporting a driving wheel, the lateral links must be arranged so that the wheel is moved in the direction of toe-in not only when the vehicle is decelerated but also when the vehicle is driven forward. However, if the lateral links are arranged in the latter manner, the wheel which has been cause to move in the direction of toe-in will once momentarily caused to toe out and then caused to move in the direction of toe-in again as the wheel is replaced rearward when the vehicle is abruptly decelerated. The transient movement of the wheel in the direction of toe-out will adversely affect the driving stability of the vehicle. This also applies to the so-called multi-link type suspension having an A-shaped arm and an I-shaped arm.

SUMMARY OF THE INVENTION

In view of the foregoing observations and description, the primary object of the present invention is to provide a suspension system which can support a driving wheel without permitting the transient movement of the wheel in the direction of toe-out during deceleration of the vehicle.

In accordance with the present invention, there is provided a suspension system for a vehicle comprising a driving wheel support means which supports for rotation a driving wheel of the vehicle, and a wheel guide means which includes a plurality of arm members each of which is connected to the driving wheel support means at its outer end and to the vehicle body at its inner end, and restrains the toe angle of the driving wheel, characterized in that said wheel guide means is arranged to cause the driving wheel to move in the direction of toe-in when a rearward load acts on the driving wheel and the driving wheel is displaced rearward, and includes a resilient support means and a toe-out restraining means, the resilient support means resiliently supporting the driving wheel support means relative to the vehicle body and being arranged to contract when an external force acts thereon in a certain direction and to expand when an external force acts thereon in the reverse direction so that the driving wheel moves in the direction of toe-in when a forward driving force acts on the driving wheel, and when a rearward load acts on the driving wheel while a forward driving force is acting on the driving wheel, the toe-out restraining means restraining the resilient support means from abruptly displacing the driving wheel in the direction of toe-out while permitting the resilient support means to slowly displace the driving wheel in the direction of toe-out.

In the suspension system of the present invention, the wheel can be displaced in the direction of toe-in when the vehicle is driven forward by virtue of the resilient support means and at the same time, the transient movement of the wheel in the direction of toe-out during deceleration of the vehicle can be prevented by virtue of the toe-out restraining means.

BRIEF DESCRIPTION OF THE INVENTION

FIG. 1 is an exploded perspective view of the suspension system in accordance with an embodiment of the present invention, FIG. 2 is an enlarged plan view of the suspension cross member, FIG. 3 is a rear view of the suspension cross member, FIG. 4 is a side view of the same, FIG. 5 is an enlarged plan view showing the connection of the suspension cross member to the upper control arm, FIG. 6 is an enlarged perspective view showing the connection of the first lateral link to the rear frame, FIG. 7 an enlarged perspective view showing the connection of the trailing link to the auxiliary link, FIG. 8 is an enlarged perspective view showing a modification of the auxiliary link, FIG. 9 is an enlarged perspective view showing another modification of the auxiliary link, FIG. 10 is an enlarged cross sectional view showing the cross member side pivotal point of the trailing link, FIG. 11 is an enlarged cross-sectional view showing the attenuation resilient means, FIG. 12 is an enlarged cross-sectional view showing a modification of the attenuation resilient means, FIG. 13 is an enlarged cross-sectional view showing another modification of the attenuation resilient means, FIG. 14A is an enlarged cross-sectional view showing still another modification of the attenuation resilient means, FIG. 14B is a cross-sectional view taken along line XIVB—XIVB in FIG. 14A, FIG. 15 is an enlarged cross-sectional view showing still another modification of the attenuation resilient means, FIG. 16 is a schematic view for illustrating the operation of the suspension system shown in FIG. 1, and FIGS. 17 and 18 are views similar to FIG. 10 but for illustrating other embodiments of the present invention.

DESCRIPTION OF THE PREFERRED EMBODIMENT

Figure 1:
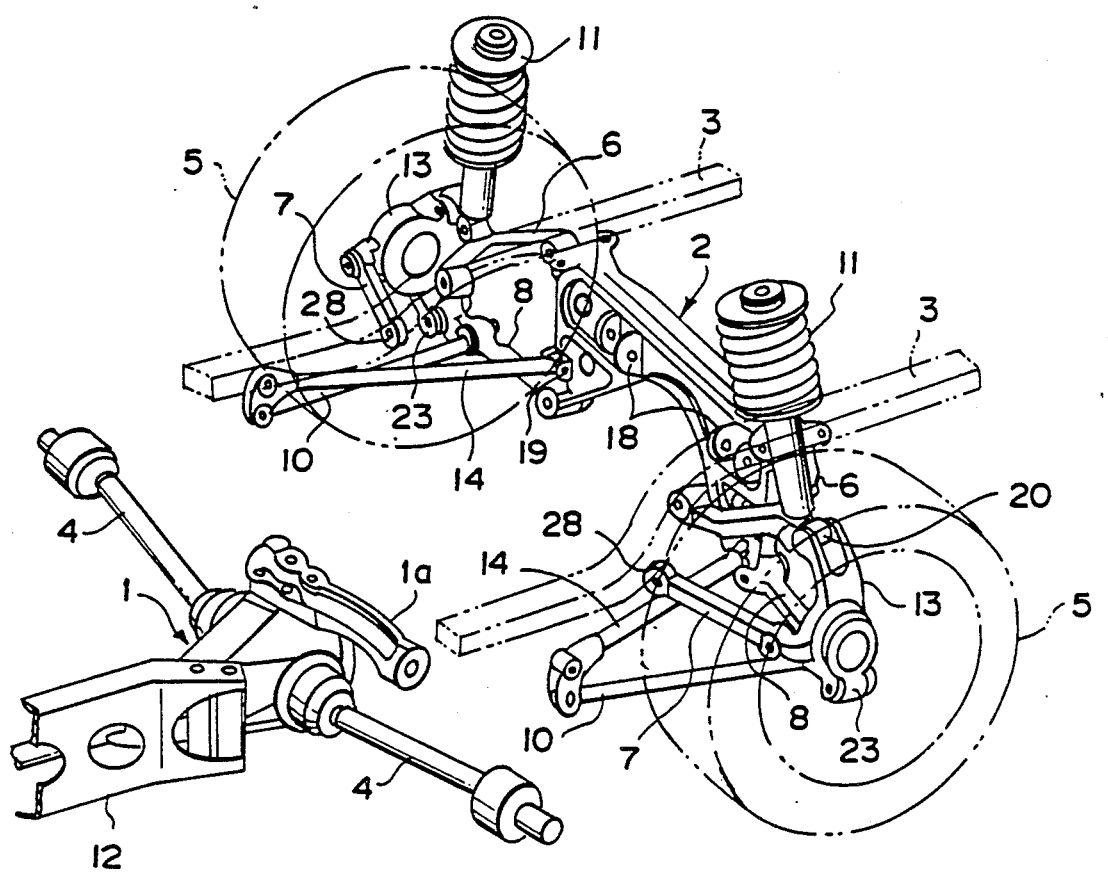

In FIG. 1, a suspension system in accordance with an embodiment of the present invention is associated with a suspension cross member 2 which supports a differential 1, a rear frame 3 which forms a chassis and a wheel (rear wheel in this particular embodiment) 5 which is rotatably supported on a drive shaft 4 connected to the differential 1. The suspension system comprises an upper control arm 6; first and second lateral links 7 and 8 which function as a lower control arm; and a trailing link 10 which is interposed between the second lateral link 8 on the rear side of the trailing link 10 and a floor panel 9 which forms the chassis. Reference numeral 11 denotes a shock absorber, reference numeral 12 denotes a power plant frame which connects the differential 1 to the engine unit (not shown), reference numeral 13 denotes a knuckle which is pivotally connected to the outer end of the drive shaft 4, and reference numeral 14 denotes an auxiliary link which is provided between the lower portion of the front wall of the suspension cross member 2 and a part of the chassis.

Figure 2:
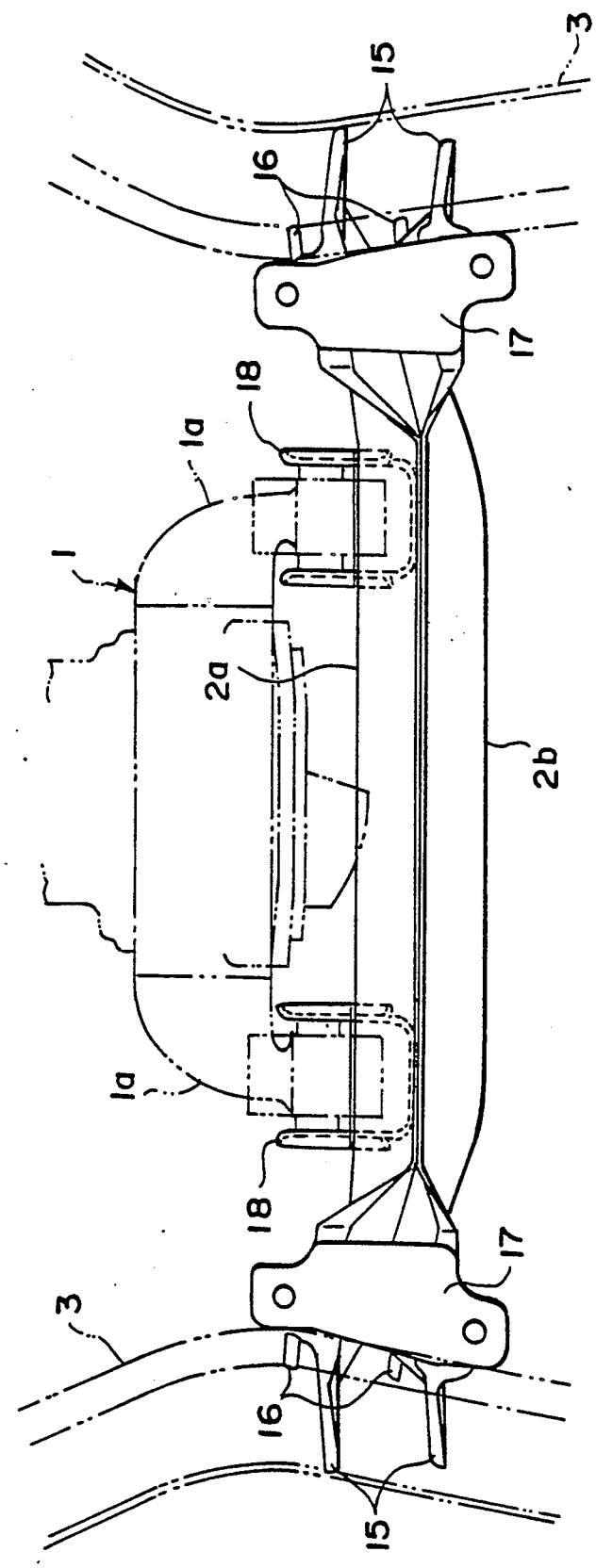
Figure 3:
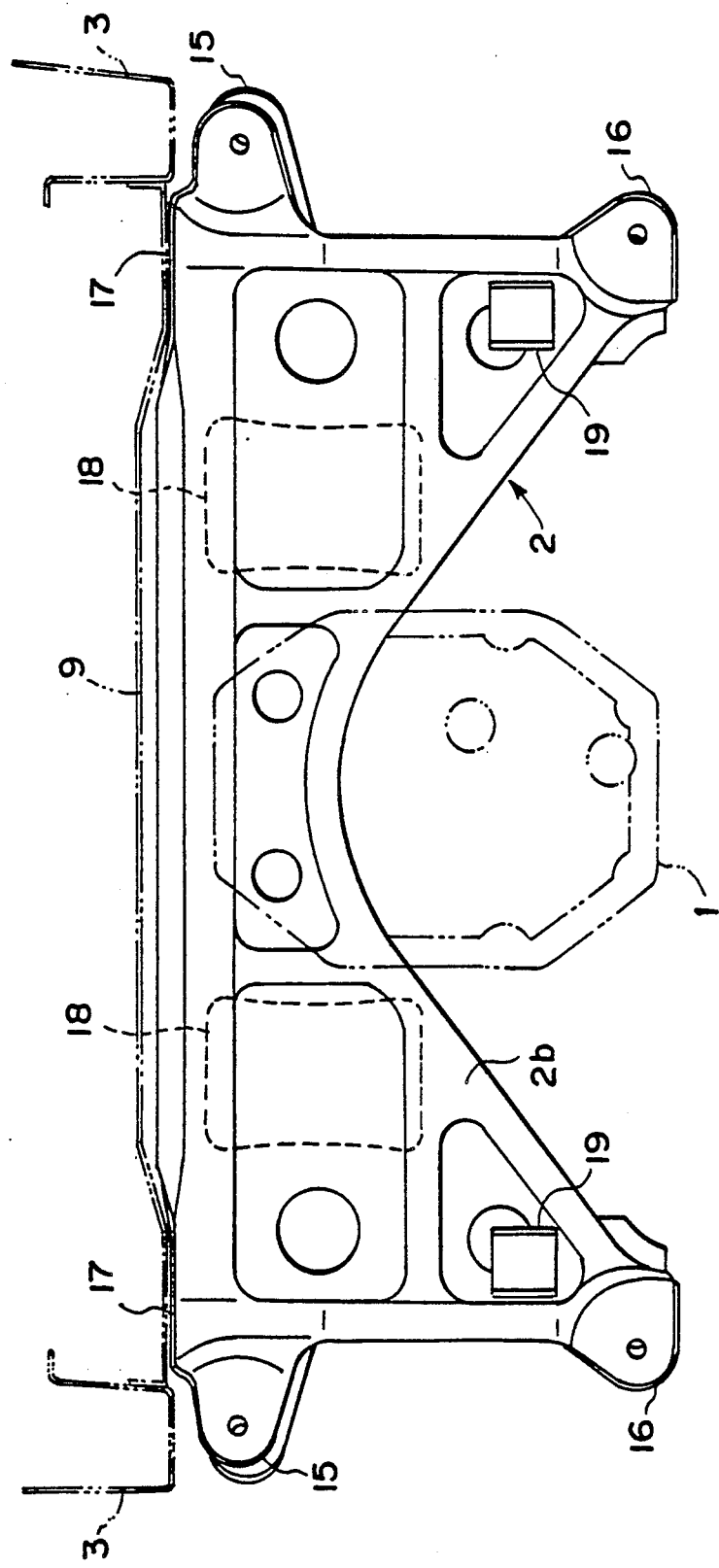
Figure 4:
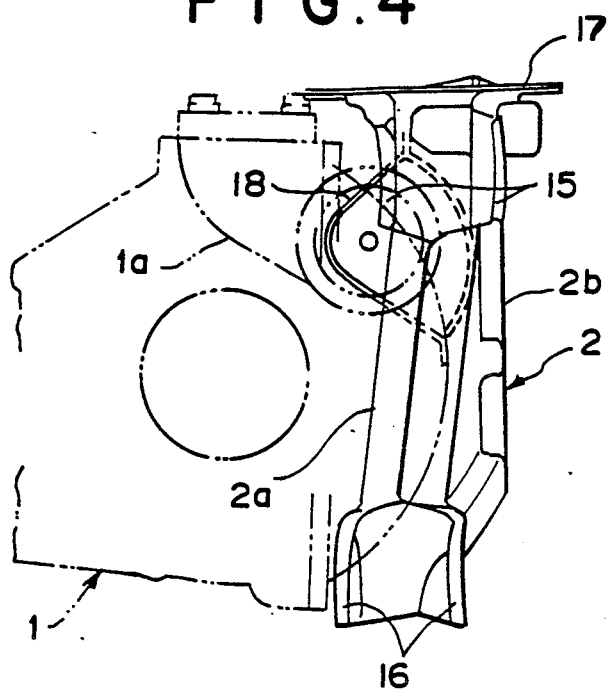

The suspension cross member 3 comprises, as shown in FIGS. 2 to 4, front and rear vertical plate members 2a and 2b which are welded together and respectively forms the front and rear walls thereof. The inner ends of the upper control arm 6 and the second lateral link 8 are respectively pivoted on upper and lower support brackets 15 and 16 formed of projections which are integral with the upper and lower portions of one end of the suspension cross member 3. The front and rear vertical plate members 2a and 2b are welded so that they form a closed cross-section, whereby the rigidity of the suspension cross member 3 is increased. The projections which forms each of the upper and lower support brackets 15 and 16 are formed on the end portions of the front and rear vertical plate members 2a and 2b which are bent away from each other. With this arrangement, the suspension cross member 2 may be small in thickness and can be small in weight and size.

A pair of reinforcement plates 17 connect the upper surfaces of the front and rear vertical plate members 2a and 2b at respective ends of the suspension cross member 2. The reinforcement plates 17 are fixed to the floor panel 9 and the suspension cross member 2 is thereby rigidly connected to the chassis. A pair of mounting brackets 18 are fixed to the front face of the front vertical plate member 2a between the reinforcement plates 17. A pair of supporting arms 1a of the differential 1 are supported by the respective mounting brackets 18 by way of resilient members (not shown). When the differential 1 is supported at two points nearer to the center of the chassis than the points at which the suspension cross member 2 is supported on the chassis, the vibration of the differential 1 is absorbed to some extent while the vibration is transmitted from the mounting brackets 18 to the reinforcement plates 17. Reference numeral 19 denotes a bracket on which the rear end of the auxiliary link 14 is mounted.

Figure 5:
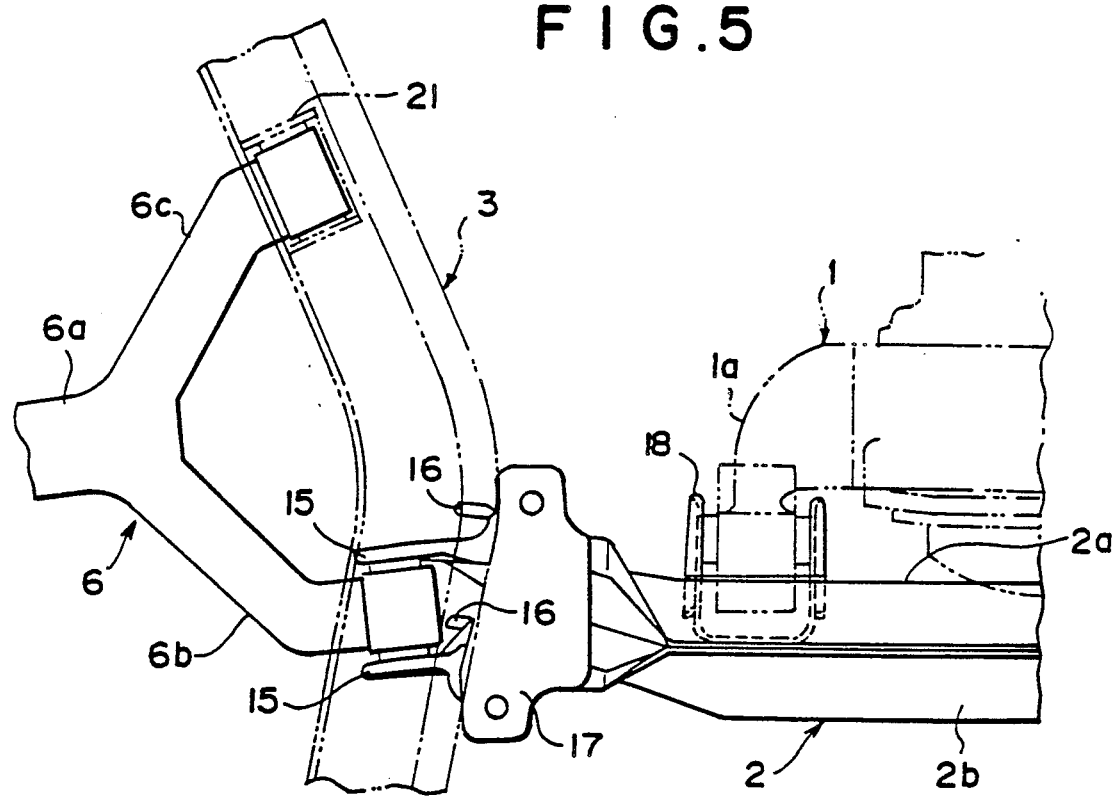

The upper control arm 6 has a base portion 6a which is connected to the knuckle 13 by way of a ball joint 20 (FIG. 1), a first branch portion 6b which is pivoted on the upper support bracket 15 and a second branch portion 6c which is pivoted on a bracket 21 fixed to the rear frame 3, and is substantially A-shaped in plan (FIG. 5).

Figure 6:
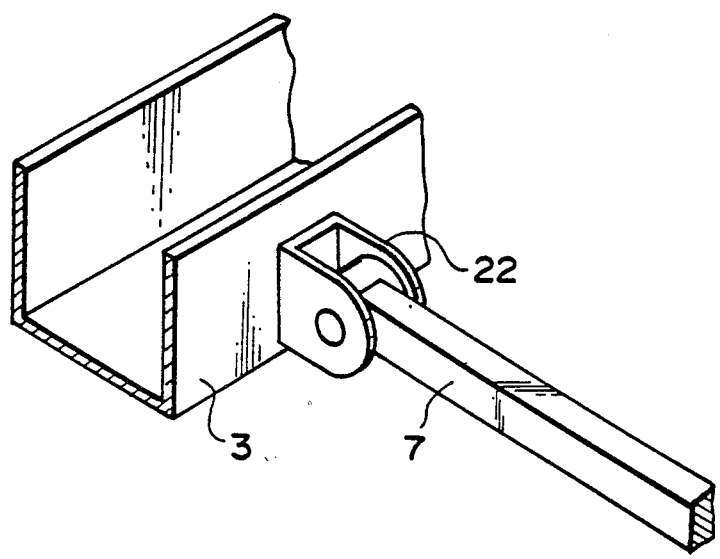
Figure 7:
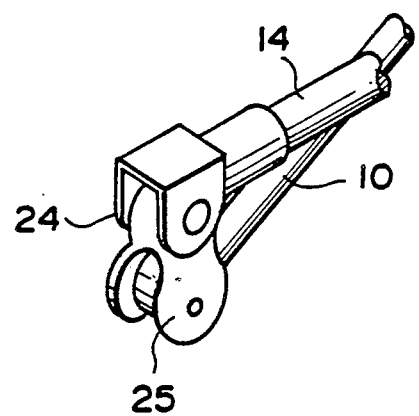

The first and second lateral links 7 and 8 are formed I-shaped arm members. The first lateral link 7 which is ahead of the second lateral link 8 is pivoted on the knuckle 13 at one end and pivoted, at the other end, on a bracket 22 fixed to the rear frame 3. (See FIG. 6) The second lateral link 8 is pivoted on the knuckle 13 by way of a ball joint 23 (FIG. 1) at one end, and pivoted on the lower support bracket 16 of the suspension cross member 2 at the other end. The point at which the first lateral link 7 is pivoted on the rear frame 3 is positioned ahead of the point at which the first lateral link 7 is pivoted on the knuckle 13. The former point will be referred to as "the rear frame side pivotal point" and the latter point will be referred to as "the knuckle side pivotal point", hereinbelow. The point at which the second lateral link 8 is pivoted on the suspension cross member 2 is behind the point at which the second lateral link 8 is pivoted on the knuckle 13. The former point will be referred to as "the cross member side pivotal point" and the latter point will be referred to as "the knuckle side pivotal point", hereinbelow. Thus the first and second lateral links 7 and 8 form substantially a trapezoid in plan. With this arrangement, when the vehicle is decelerated and the wheel 5 is displaced rearward, the inclination of the second lateral link 8 is reduced and the inclination of the first lateral link 7 is increased, whereby the knuckle side pivotal point of the second lateral link 8 is pushed outward and the knuckle side pivotal point of the first lateral link 7 is pulled inward, thereby moving the wheel 5 in the direction of toe-in.

The front end of the auxiliary link 14, whose rear end is rigidly connected to the bracket 19 fixed to the front vertical plate member 2a of the suspension cross member 2, is rigidly connected to a bracket 24 which is fixed to the floor panel 9. A bracket 25 is formed on the front end of the auxiliary link 14 and the front end of the trailing link 10 is pivoted on the bracket 25. The rear end of the trailing link 10 is connected to a portion of the second lateral link 8 near the knuckle side pivotal point by way of a rubber member. The auxiliary link 14 prevents forward and rearward inclinations of the suspension cross member 2 which are apt to occur due to the small thickness of the suspension cross member 2.

Figure 8:
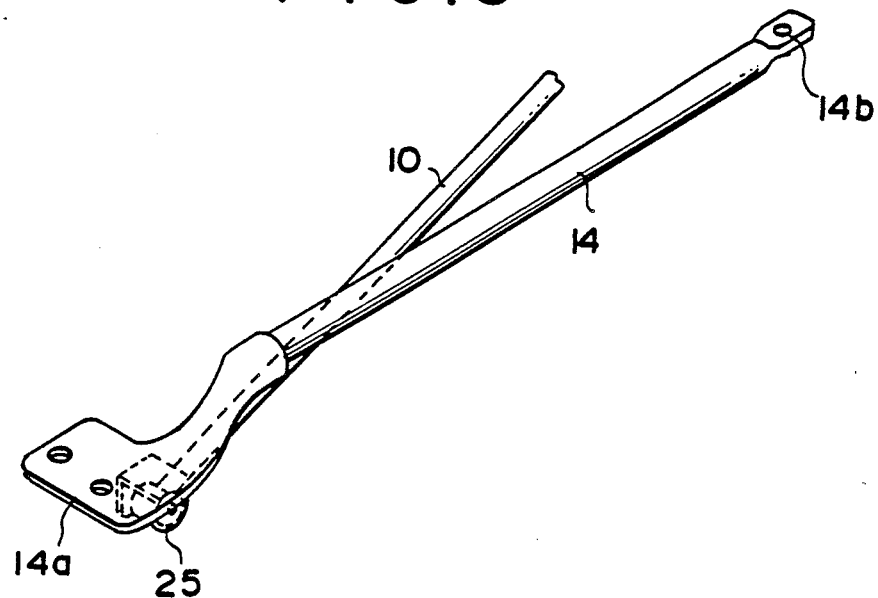
Figure 9:
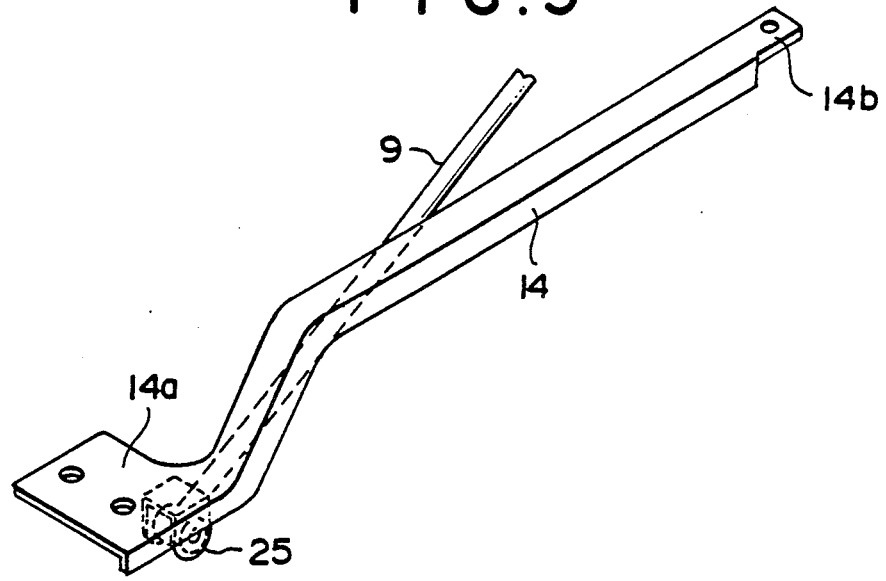

Instead of being fixed to the floor panel 9 and the suspension cross member 2 by way of brackets, the ends of the auxiliary link 14 may be directly connected to the floor panel 9 and the suspension cross member 2 as shown in FIGS. 8 and 9. That is, in the modification shown in FIG. 8, the auxiliary link 14 has flat fixing portions 14a and 14b at the respective ends, and the fixing portions 14a and 14b are fixed to the lower surfaces of the floor panel 9 and the suspension cross member 2. In the modification shown in FIG. 9, the whole auxiliary link 14 is formed of flat plate material. In the modifications shown in FIGS. 8 and 9, the bracket 25 on which the front end of the trailing link 10 is pivoted is welded to the lower surface of the fixing portions 14a.

As shown in FIG. 10, a cylindrical portion 10a is formed on the front end of the trailing link 10 and a shaft 25a is supported by the bracket 25. A cylindrical rubber bushing 26 is interposed between the cylindrical portion 10a and the shaft 25a. A cavity 27 is formed in the rubber bushing 26 in the part in front of the shaft 25a so that the rubber bushing 26 exhibits a low modulus in compression against a compressive force which acts thereon rearward. That is, when the vehicle is being driven forward and a forward force is acting on the trailing link 10, the rubber bushing 26 exhibits a high modulus in compression and less deforms, and when the vehicle is being decelerated and a rearward force is acting on the trailing link 10, the rubber bushing 26 exhibits a low modulus in compression and deforms easily. With this arrangement, the trailing link 10 more limits the forward and rearward movements of the wheel 5 while the vehicle is being driven forward than while the vehicle is being decelerated. That is, the wheel 5 can move back and forth by a larger amount during deceleration of the vehicle than during forward driving of the vehicle. Accordingly, the wheel 5 can move easily in the direction of toe-in during deceleration of the vehicle.

The first lateral link 7 is provided with an attenuation resilient means 28 which permits a movement of the wheel 5 in the direction of toe-in but restrains an abrupt movement of the wheel 5 in the direction of toe-out. As the attenuation resilient means 28, those shown in FIGS. 11 to 14 can be used.

The attenuation resilient means 28 shown in FIG. 11 comprises a rubber bushing 29 interposed between a cylindrical portion 7a formed on the end portion of the first lateral link 7 and a shaft 22a supported by the bracket 22, first and second fluid chambers 30 and 31 and a communicating passage 32 which communicates the first and second fluid chambers 30 and 31 with each other. The first and second fluid chambers 30 and 31 are formed on opposite sides of the shaft 22a in the rubber bushing 29 at portions which are compressed when a force acts on the first lateral link 7 in the transverse direction of the vehicle body. The fluid chambers 30 and 31 and the communicating passage 32 are filled with oil. The communicating passage 32 comprises an orifice portion 32a which communicates with the first fluid chamber 30 and extends in the direction perpendicular to the direction in which the rubber bushing 29 is compressed by the force acting on the first lateral link 7 in the transverse direction of the vehicle body, and a communicating portion 32b which communicates the orifice portion 32a with the second fluid chamber 31.

When a force acts on the first lateral link 7 toward the center of the vehicle body (in the direction shown by arrow A in FIG. 11), the rubber bushing 29 deforms with the oil in the first fluid chamber 30 flowing into the second fluid chamber 31 through the communicating passage 32, whereby the first lateral link 7 is permitted to move in the direction of toe-in. When a force abruptly acts on the first lateral link 7, which has been moved in the direction of toe-in, outward of the vehicle body (in the direction shown by arrow B in FIG. 11), the oil which has moved to the second fluid chamber 31 cannot return to the first fluid chamber 30 since the orifice portion 32a of the communicating passage 32 has been compressed, and accordingly, the rubber bushing 29 cannot deform substantially, whereby the movement of the first lateral link 7 in the direction of toe-out is restrained. The attenuation resilient means 28 thus permits movements of the wheel 5 in the direction of toe-in while restrains abrupt movements of the wheel 5 in the direction of toe-out.

In the attenuation resilient means 28 shown in FIG. 12, the first and second fluid chambers 30 and 31 are communicated with each other by a communicating passage 32 which extends in the direction parallel to the direction in which the rubber bushing 29 is compressed by the force acting on the first lateral link 7 in the transverse direction of the vehicle body, and a lip-like check valve 33 which permits the oil to flow into the second fluid chamber 31 but prevents the oil from quickly flowing out the second fluid chamber 31 is provided at the portion at which the communicating passage 32 opens to the second fluid chamber 31.

The attenuation resilient means 28 shown in FIG. 13 is substantially the same as that shown in FIG. 12 except that the check valve 33 is formed of a ball instead of the lip. Reference numeral 34 in FIG. 13 denotes a ball holder which prevents the ball from falling off.

Figure 14A:
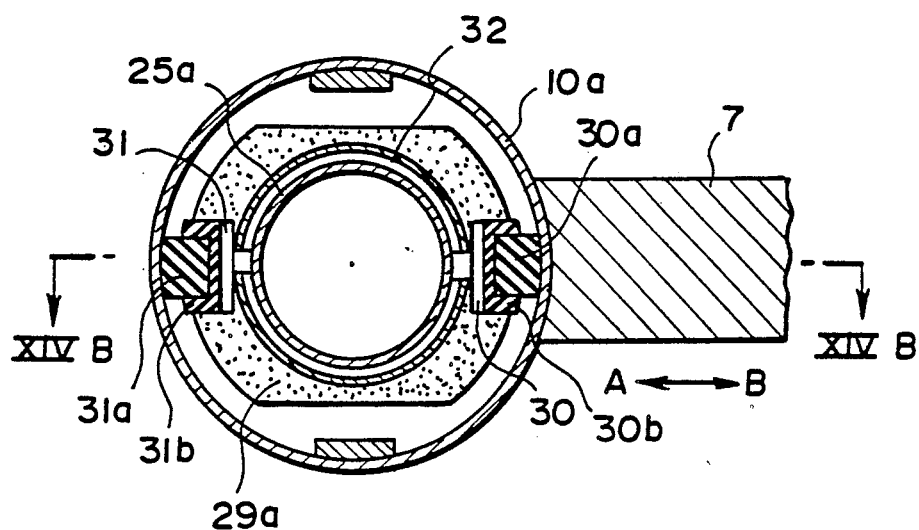
Figure 14B:
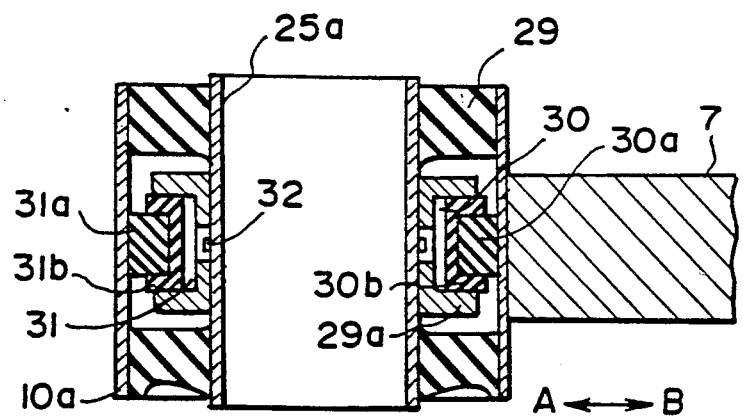

In the attenuation resilient means 28 shown in FIGS. 14A and 14B, an annular metal body 29a is fitted on the shaft 25a. The metal body 29a has a pair of recesses which are diametrically opposed to each other in the direction in which the rubber bushing 29 is compressed by the force acting on the first lateral link 7 in the transverse direction of the vehicle body. A piston 30a which is fixed to the inner surface of the cylindrical portion 10a and is capped with a seal rubber 30b is snugly fitted in one of the recesses and forms the first fluid chamber 30. Similarly a piston 31a which is fixed to the inner surface of the cylindrical portion 10a and is capped with a seal rubber 31b is snugly fitted in the other recesses and forms the second fluid chamber 31. An annular groove which communicates with the first and second fluid chambers 30 and 31 through orifices is formed on the inner peripheral surface of the metal body 29a and defines the communicating passage 32. When a force acts on the first lateral link 7 toward the center of the vehicle body, the rubber bushing 29 deforms with the oil in the first fluid chamber 30 being forced out of the first fluid chamber 30 and into the second fluid chamber 31 through the communicating passage 32 by the piston 30a, whereby the first lateral link 7 is permitted to move in the direction of toe-in. When a force abruptly acts on the first lateral link 7, which has been moved in the direction of toe-in, outward of the vehicle body, the oil which has moved to the second fluid chamber 31 cannot return quickly to the first fluid chamber 30 since the piston 30a has occupied the space in the first fluid chamber 30 and the communicating passage 32 is limited in cross section, whereby the movement of the first lateral link 7 in the direction of toe-out is restrained. The attenuation resilient means 28 thus permits movements of the wheel 5 in the direction of toe-in while restrains abrupt movements of the wheel 5 in the direction of toe-out.

The attenuation resilient means 28 shown in FIG. 15 is provided at an intermediate portion of the first lateral link 7. That is, as shown in FIG. 15, the first lateral link 7 is divided into a chassis side portion 35 and a knuckle side portion 36, and the attenuation resilient means 28 is interposed between the chassis side portion 35 and the knuckle side portion 36. The attenuation resilient means 28 comprises a cylinder 37 which is fixed to the end of the chassis side portion 35 and is filled with oil, and a piston 38 which is fixed to the end of the knuckle side portion 36 and is slidably fitted in the cylinder 37. The piston 38 divides the space in the cylinder 37 into first and second fluid chambers 37a and 37b, and is provided with a pair of passages 39 which communicates the first and second fluid chambers 37a and 37b with each other. A check valve 40 in the form of a plate which permits the oil to flow from the second fluid chamber 37b to the first fluid chamber 37a but does not permit abrupt flow of the oil from the first fluid chamber 37a to the second fluid chamber 37b is provided on the opening at which each of the passages 39 open to the first fluid chamber 37a. Each of the check valves 40 is provided with an orifice 41 which permits the oil to slowly flow from the second fluid chamber 37b into the first fluid chamber 37a. Reference numeral 42 denotes a spring which urges the check valve 40 toward the piston 38. Reference numerals 44 and 45 respectively denote cushion members. When a force acts on the first lateral link 7 toward the center of the vehicle body, the knuckle side portion 36 moves in the direction of toe-in with the oil in the second fluid chamber 37b flowing into the first fluid chamber 37a. When a force abruptly acts on the first lateral link 7, which has been moved in the direction of toe-in, outward of the vehicle body, the oil which has moved to the first fluid chamber 37a cannot return to the second fluid chamber 37b, and accordingly, the movement of the knuckle side portion 36 in the direction of toe-out is restrained.

The operation of the suspension system of this embodiment will be described, hereinbelow.

When the vehicle is driven forward, a force which urges the wheel 5 forward is produced and acts on the knuckle side pivotal point of the second lateral link 8. However the force is restrained by the trailing link 10 and as a result, there is produced a force which tends to turn the knuckle 13 and the wheel 5 about an imaginary king pin which joins the knuckle side pivotal points of the upper control arm 6 and the second lateral link 8. The force acts on the first lateral link 7 toward the center of the vehicle body, and since the attenuation resilient means 28 permits the first lateral link 7 to move in the direction of toe-in as described above, the wheel 5 is caused to toe in as shown by the chained line in FIG. 16. The amount of toe-in of the wheel is substantially proportional to the driving force, and since more driving force is required as the vehicle speed increases when the vehicle is cruising, the rate of change in the amount of toe-in is larger when the vehicle speed is high than when the vehicle speed is low, whereby an improved running stability can be obtained When the vehicle is abruptly decelerated while the vehicle is running forward, the wheel 5 tends to move rearward and a force acts on the first lateral link 7 in the direction of toe-out. However, since the movement of the first lateral link 7 in the direction of toe-out is restrained by the attenuation resilient means 28, the wheel 5 moves rearward holding its toe-in position as shown by the dashed line in FIG. 16. That is, the transient movement of the wheel 5 in the direction of toe-out during deceleration of the vehicle can be effectively prevented. As the wheel 5 moves rearward during deceleration, the wheel 5 is further moved in the direction of toe-in by virtue of the first and second lateral links 7 and 8. As a result, an amount of toe-in corresponding to the vehicle speed can be obtained also during deceleration, whereby the running stability is further improved.

Figure 17:
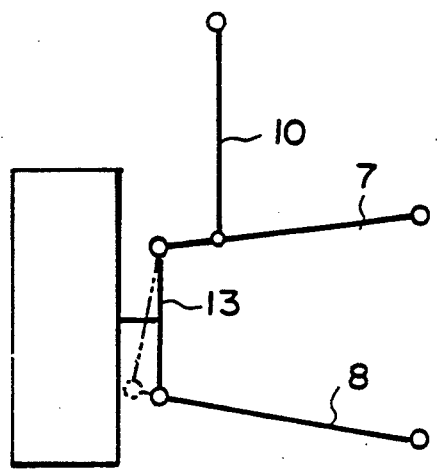
Figure 18:
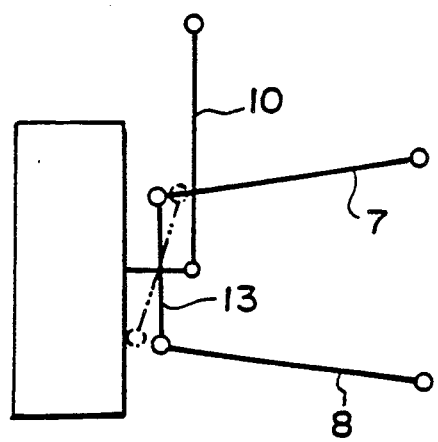

Though the present invention has been described above with reference to the suspension system in which the rear end of the trailing link 10 is connected to the second lateral link 8 which is positioned behind the first lateral link 7, the present invention may be applied to the suspension system in which the rear end of the trailing link 10 is connected to the first lateral link 7 which is positioned ahead of the second lateral link 8 or to the suspension system in which the rear end of the trailing link 10 is connected to the knuckle 13 as shown in FIGS. 17 and 18. In the arrangement shown in FIG. 17, the attenuation resilient means 28 is provided, as will be apparent to those skilled in the art from the description above, on the second lateral link 8 which is positioned rearward. When one of the attenuation resilient means 28 shown in FIGS. 11 to 13 and 15 is used, the orientation of the attenuation resilient means 28 should be reverse to those shown in those figures. In the arrangement shown in FIG. 8, the attenuation resilient means 28 may be provided on either of the first and second lateral links 7 and 8.

Though the attenuation resilient means 28 shown in FIGS. 11 to 13 and 15 are arranged to permit the first lateral link 7 to move in the direction of toe-in even when a force abruptly acts on the first lateral link 7, this is not necessarily needed provided that the wheel 5 is kept toeing in while the vehicle is driven forward.

We claim:

1. A suspension system for a vehicle comprising a driving wheel support means which supports for rotation a driving wheel of the vehicle, and a wheel guide means which includes a plurality of arm members each of which is connected to the driving wheel support means at its outer end and to the vehicle body at its inner end, and restrains the toe angle of the driving wheel, characterized in that said wheel guide means is arranged to cause the driving wheel to move in the direction of toe-in when a rearward load acts on the driving wheel and the driving wheel is displaced rearward, and includes a resilient support means and a toe-out restraining means, the resilient support means resiliently supporting the driving wheel support means relative to the vehicle body and being arranged to contract when an external force acts thereon in a certain direction and to expand when an external force acts thereon in the reverse direction so that the driving wheel moves in the direction of toe-in when a forward driving force acts on the driving wheel, and when a rearward load acts on the driving wheel while a forward driving force is acting on the driving wheel, the toe-out restraining means restraining the resilient support means from abruptly displacing the driving wheel in the direction of toe-out while permitting the resilient support means to slowly displace the driving wheel in the direction of toe-out.

2. A suspension system as defined in claim 1 in which said wheel guide means comprises a pair of lateral link members which extend substantially in the transverse direction of the vehicle body and are spaced from each other by a predetermined distance in the longitudinal direction of the vehicle body, the distance between the connections of the lateral link members to the vehicle body as measured in the longitudinal direction of the vehicle body being larger than that between the connection of them to the driving wheel support means so that the driving wheel is caused to move in the direction of toe-in when a rearward load acts on the driving wheel and the driving wheel is displaced rearward.

3. A suspension system as defined in claim 1 in which said resilient support means comprises a bushing which has a resilient member.

4. A suspension system as defined in claim 3 in which said resilient support means is a tubular rubber bushing.

5. A suspension system as defined in claim 1 in which said toe-out restraining means includes an attenuating force generating means which has a plurality of fluid chambers and a communicating passage which communicates the fluid chambers each other, and generates an attenuating force when the volumes of the fluid chambers change and the fluid in the fluid chambers flows through the communicating passage.

6. A suspension system as defined in claim 5 in which at least one of said arm members of the wheel guide means is pivoted on the vehicle body and the driving wheel support means by way of respective pivotal mounting means, and said attenuating force generating means is incorporated in at least one of the pivotal mounting means.

7. A suspension system as defined in claim 6 in which the pivotal mounting means in which said attenuating force generating means is incorporated is a cylindrical rubber bushing which comprises an inner tubular member, an outer tubular member which is coaxially fit on the inner tubular member and a rubber member interposed between the inner and outer tubular members.

8. A suspension system as defined in claim 7 in which two of said fluid chambers of the attenuation force generating means are disposed between the inner and and outer tubular members on opposite sides of the inner tubular member and are arranged in a row in the direction of the axial force acting on the arm member of the driving wheel support means.

9. A suspension system for a vehicle comprising
a driving wheel support means which supports for rotation a driving wheel of the vehicle,
a front and rear lateral link members which extend substantially in the transverse direction of the vehicle body and are spaced from each other by a predetermined distance in the longitudinal direction of the vehicle body, and each of which is pivoted on a vehicle body side member by way of a pivotal mounting member at its inner end and on the driving wheel support means by way of a pivotal mounting member at its outer end, the distance between the connections of the lateral link members to the vehicle body side member as measured in the longitudinal direction of the vehicle body being larger than that between the connection of them to the driving wheel support means, and
a trailing link member which extends substantially in the longitudinal direction of the vehicle body and is connected to a vehicle body side member at its front end and to one of the front and rear lateral link members and the driving wheel support means at its rear end,
at least one of said pivotal mounting members being a resilient bushing which deforms when driving force acts on the driving wheel and a forward force acts on the driving wheel support means and causes the driving wheel to move in the direction of toe-in, the resilient rubber bushing being provided with a toe-out restraining means which permits the wheel to move in the direction of toe-in under the forward force acting on the driving wheel support means but restrains the driving wheel from abruptly moving in the direction of toe-out.

10. A suspension system as defined in claim 9 in which said toe-out restraining means is an attenuation force generating means which generates a resisting force which restrains the driving wheel from moving in the direction of toe-out when it moves quickly in the direction of toe-out but does not generate the resisting force when the driving wheel moves slowly in the direction of toe-out.

11. A suspension system as defined in claim 10 in which said attenuating force generating means has a plurality of fluid chambers and a communicating passage which communicates the fluid chambers each other, and generates an attenuating force when the volumes of the fluid chambers change and the fluid in the fluid chambers flows through the communicating passage.

12. A suspension system as defined in claim 11 in which said resilient bushing comprises an inner tubular member, an outer tubular member which is coaxially fit on the inner tubular member and a rubber member interposed between the inner and outer tubular members, and said attenuating force generating means is incorporated between the inner and outer tubular members.

13. A suspension system as defined in claim 12 in which said fluid chambers are arranged in a row in the transverse direction of the vehicle body on opposite sides of the inner tubular member.

14. A suspension system as defined in claim 9 in which said trailing link member resiliently supports the driving wheel support member by way of a resilient bushing to permit a predetermined amount of movement of the driving wheel support member in the longitudinal direction of the vehicle body.

15. A suspension system as defined in claim 14 in which said resilient bushing exhibits a lower modulus in compression when the driving wheel support member is displaced rearward than when it is displaced forward.

16. A suspension system as defined in claim 9 in which the front end of said trailing link member is pivoted on the vehicle body side member by way of a rubber bushing which exhibits a lower modulus in compression when the trailing link is pulled than when it is pushed.

17. A suspension system as defined in claim 9 in which the rear end of the trailing link member is connected to the rear lateral link member and one of said pivotal mounting members on the inner and outer ends of the front lateral link member is the resilient bushing.

18. A suspension system as defined in claim 9 in which the rear end of the trailing link member is connected to the front lateral link member and one of said pivotal mounting members on the inner and outer ends of the rear lateral link member is the resilient bushing.

19. A suspension system as defined in claim 9 in which the rear end of said trailing link member is connected to the driving wheel support member.

* * * * *